United States Patent
Tanaka et al.

(10) Patent No.: US 6,686,009 B2
(45) Date of Patent: Feb. 3, 2004

(54) TRAY FOR CARRYING MAGNETORESISTIVE HEAD OF MAGNETIC DISK

(75) Inventors: Shigeru Tanaka, Tokyo (JP); Koichi Sagisaka, Ibaraki (JP); Tomohiro Kaniwa, Ibaraki (JP); Mitsuo Sato, Ibaraki (JP); Michiaki Sakatoku, Tokyo (JP)

(73) Assignee: Yukadenshi Co., Ltd., Tokyo (JP)

( * ) Notice: Subject to any disclaimer, the term of this patent is extended or adjusted under 35 U.S.C. 154(b) by 0 days.

(21) Appl. No.: 10/005,621

(22) Filed: Dec. 10, 2001

(65) Prior Publication Data

US 2002/0060314 A1 May 23, 2002

Related U.S. Application Data

(63) Continuation of application No. PCT/JP00/02301, filed on Apr. 10, 2000.

(51) Int. Cl.[7] .................................................. B65D 6/00
(52) U.S. Cl. ...................................... 428/35.7; 206/819
(58) Field of Search .......................... 428/35.7; 206/819

(56) References Cited

U.S. PATENT DOCUMENTS

| | | | |
|---|---|---|---|
| 5,643,990 A | * | 7/1997 | Uehara et al. ............... 524/496 |
| 5,651,922 A | | 7/1997 | Nahass et al. ............... 252/511 |
| 5,876,632 A | | 3/1999 | Miyakawa et al. |

FOREIGN PATENT DOCUMENTS

WO      WO 94/23433      10/1994

* cited by examiner

*Primary Examiner*—Sandra M. Nolan
(74) *Attorney, Agent, or Firm*—Oblon, Spivak, McClelland, Maier & Neustadt, P.C.

(57) ABSTRACT

A tray for carrying magnetoresistive heads of magnetic disks which is obtained by molding a resin composition comprising 100 parts by weight of a thermoplastic resin material and, incorporated therein, from 0.1 to 8 parts by weight of carbon fibrils having a fiber diameter of 100 nm or smaller and a fiber length/fiber diameter ratio of 5 or larger. The tray has a stable surface resistivity in the range of from $10^4$ to $10^{12}$ Ω/□, has an even surface state, and hardly generates particles upon scratching, wearing, or cleaning.

17 Claims, 3 Drawing Sheets

TRAY FOR CARRYING MAGNETORESISTIVE HEAD OF MAGNETIC DISK

TECHNICAL FIELD

The present invention relates to a tray for carrying a magnetoresistive head (hereinafter often referred to as "MR head") of magnetic disks.

BACKGROUND ART

Trays used for carrying wafers, IC chips, and other electronic parts are required to have antistatic properties. Because of this, antistatic properties have conventionally been imparted to such trays by using as a molding material, a resin composition comprising a resin such as an ABS resin, and an antistatic agent or a conductivity-imparting ingredient (e.g., carbon black) dispersed therein.

However, the trays obtained by molding the resin composition containing an antistatic agent or a conductivity-imparting ingredient (e.g., carbon black) have had the following problems. Namely, the trays containing an antistatic agent have problems, for example, that the electrical conduction therein is apt to be influenced by the ambient humidity because the mechanism of electrical conduction is attributable to ionic conduction, that the antistatic agent flows out upon cleaning and during long-term use, resulting in reduced antistatic properties, and that incorporation of a large amount of an antistatic agent impairs heat resistance. The trays containing carbon black have the following problem. Although carbon black is uninfluenced by humidity, cleaning, etc., it should be added in a large amount for imparting conductivity. As a result, the surfaces of the moldings obtained have poor resistance to scratching and wearing and are apt to release wearing dust and carbon particles.

For solving these problems, a material obtained by adding carbon fibers to, for example, a polycarbonate is used as a material for trays for carrying magnetic heads of hard disks.

Incidentally, with the recent increase in the density of heads, MR heads are coming to be mainly used in place of conventional thin-film heads. An MR head comprises an part, an MR element attached to the tip of the arm part, and a lead wire connected to the MR element.

In contrast to the conventional thin-film element in which signals are detected by detecting the current generating when the coil approaches a signal magnetic field the MR element is a device in which a slight sensing current is caused to flow therethrough and a signal magnetic field is detected based on current resistance. Due to this mechanism, MR heads have exceedingly improved detection sensitivity and this enables media to have a reduced track pitch, i.e., an increased capacity. Recently, a GMR head has been developed which is intended to attain a further increase in capacity.

Since an MR head detects signals by the mechanism in which magnetism is sensed based on a resistance change of the slight current (sensing current) flowing through the MR element as described above, there is a high possibility that even a slight noise current might damage the MR element. Consequently, as compared with conventional integrated magnetic heads and ICs, MR heads are far more sensitive to an electrostatic discharge attributable to a tray/head potential difference and to a contact current generating upon head/tray contacting.

In a process for assembling an MR head, a lead wire is connected to an MR element and thin MR element having the lead wire is attached to the tip of an arm part. In this lead wirer which is a metal wire coated with a polyimide, the polyimide/metal wire contact area is always in a charge separation state due to the contact potential difference between the polyintide and the metal wire and is hence in an electrically unstable state. As a result, the contacting of the lead wire tip to a tray is apt to result in charge transfer in the contact area and this increases the possibility of damage.

For the reasons described above, trays for carrying MR heads have a serious problem that the MR element is damaged by the electrostatic discharge or excessive contact current which occurs or flows between the device and the tray or between a peripheral part and the tray due to the too low surface resistance of the tray.

Furthermore, in MR head assembly processes, MR heads in many cases are subjected, together with the tray, to cleaning and heating/drying. The tray is hence required not to foul or damage the heads during the cleaning and heating/drying. In particular, since the tray is exposed to a drying temperature exceeding 120° C. in this drying, it is required to have such a degree of heat resistance that it can sufficiently withstand that drying temperature.

Incidentally, the performance primarily required of conventional antistatic or static-dissipating materials has been the ability to quickly eliminate static electricity generated by friction or contacting. Consequently, most of the related documents do not refer to a lower limit of resistivity (e.g., JPA-8-288266 (the term "JP-A" as used herein means an "unexamined published Japanese patent application") and JP-W-8-508534 (the term "JP-W" as used herein means an "Japanese publication of a PCT application")) . With respect to cases where a high degree of static-dissipating properties are required as in IC trays, there is a description to the effect that a surface resistivity of $10^3$ Ω/□ or higher is desirable (e.g., JP-A-8-283584).

As described above, a polycarbonate/carbon fiber material has hitherto been used as the material of trays for carrying MR heads. However, this material has the following drawbacks and it has been difficult to use it as trays for carrying MR heads, which are especially sensitive to static electricity.

(1) Although carbon fibers can impart excellent conductivity when added in a smaller amount than carbon black, the composition tends to give moldings having a low surface resistivity. Because of this, a high surface resistivity cannot be realized which is required of MR head transfer trays. When the resistivity in increased by reducing the addition amount, it is difficult to obtain a molding having an even resistivity throughout because the carbon fibers come into an unstable state with respect to contacting with one another within the molding.

(2) The carbon fibers dispersed in a resin generally have a relatively large size with a fiber diameter of about froze 7 to 12 $\mu$m and a fiber length of about from 50 to 300 $\mu$m. Because of this, the composition gives a molding in which carbon fibers are exposed on the surface thereof. As a result, the surface of the molding has areas having an exceedingly low resistivity due to the exposed carbon fibers and electrically insulating areas consisting of the resin; these two kinds of areas each has a size of about from 10 $\mu$m to 1 mm and are present in dispersed fashion. There is hence a high possibility that the sharp tip of the lead wire connected to an MR head might come into direct contact with an exposed part of the surface carbon fibers to cause damage due to an overcurrent. On the other hand, since the charges generated in the resin areas are less apt to be released, electrification occurs microscopically.

(3) In the step of subjecting MR heads as devices to ultrasonic cleaning with pure water or in other steps, carbon fibers themselves fall off the tray surface and resinous ingredients present among carbon fibers peel off. Such particles released not only cause head fouling or damage but also may come as foreign particles into the space between the head and a hard disk during the use of a hard disk drive and cause head crushing.

(4) In the case where carbon fibers are dispersedly incorporated into a resin, use is generally made of a binder for binding carbon fibers or a surface-treating agent for improving the dispersibility of the carbon fibers in the resin and improving strength at the interface therebetween. Use of these treating agents may pose problems that during cleaning with pure water, icons dissolve in the cleaning fluid (ion contamination), and that an organic compound having a relatively low molecular weight deposits on the device during heating (contamination with nonvolatile organics).

An object of the invention is to solve the above problems and provide a tray for carrying magnetoresistive heads of magnetic disks which has a stable surface resistivity in the range of from $10^4$ to $10^{12}$ $\Omega/\square$ and an even surface state considerably reduced in the generation of particles caused by scratching, wearing, or cleaning.

DISCLOSURE OF THE INVENTION

The tray of the invention for carrying a magnetoresistive head of magnetic disks is one obtained by molding of a resin composition comprising a thermoplastic resin material and carbon fibrils incorporated therein, and is characterized in that the carbon fibrils have a fiber diameter 100 nm or smaller and a fiber length/fiber diameter ratio of 5 or larger, and that the incorporation amount of the carbon fibrils is from 0.1 to 8 parts by weight per 100 parts by weight of the thermoplastic resin material.

BEST MODE FOR CARRYING OUT THE INVENTION

Figure 1:
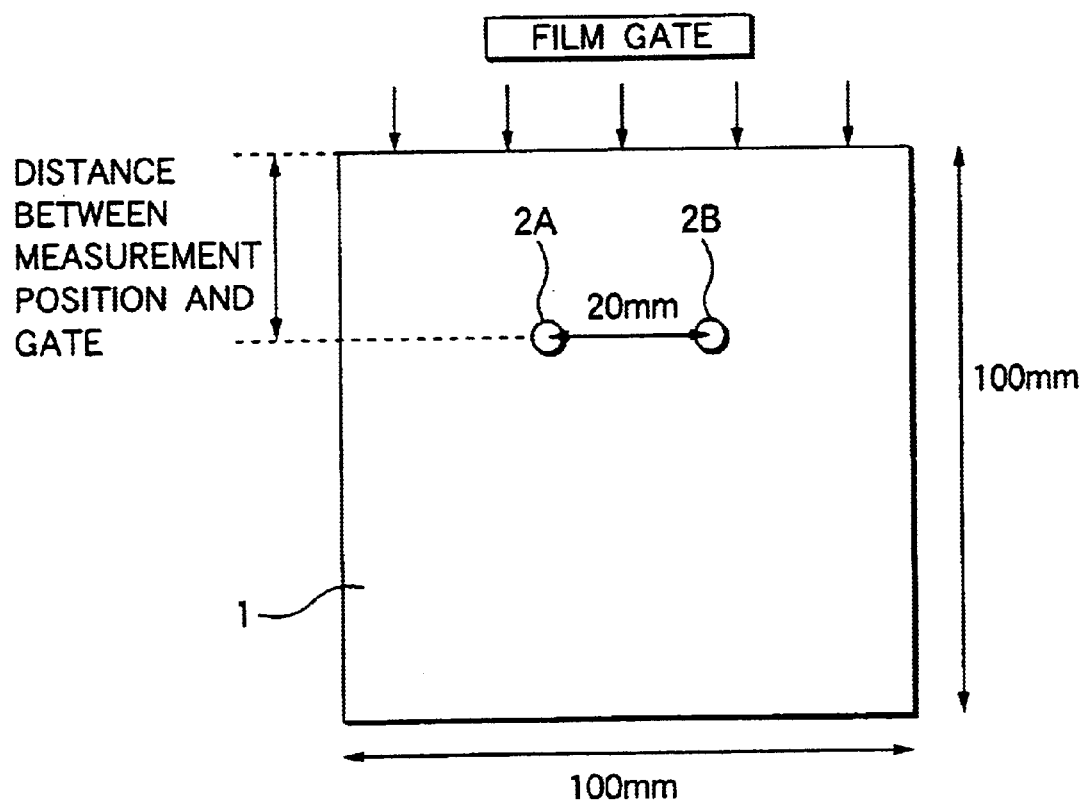
FIG. 1 is a view illustrating the method of surface resistivity measurement used in Example 1.

A carbon fibril comprises a cylindrical core and an outer layer of graphite deposited on the core substantially concentrically, and the fiber core has a tubular structure which is not straight but meanders. Since carbon fibrils of such a structure which have a fiber diameter of 100 nm or smaller and a fiber diameter/fiber diameter ratio (hereinafter referred to as "aspect ratio") of 5 or larger are used in the invention as a conductivity-imparting ingredient, the following effects are produced.

(1) Since the carbon fibrils dispersed in the matrix resin form an exceedingly fine conductive network, the molding has an even and smooth surface. Accordingly, the molding has a stable surface resistivity in a given range and in excellent in resistivity reproducibility in minute areas.

(2) Since the carbon fibrils have a shape which is not straight but meanders, the fibrils bring about an enhanced anchoring effect in the matrix resin. Consequently, the fibrils themselves hardly fall off upon scratching, wearing, or cleaning, and the resin also hardly peels off the fibers. Because of this, particle falling hardly occurs upon wearing, cleaning, etc.

(3) Carbon fibrils are less apt to cause ion contamination or contamination with nonvolatile organics.

The tray of the invention preferably has a surface resistivity of from $10^4$ to $10^{12}$ $\Omega/\square$, especially from $10^6$ to $10^{12}$ $\Omega/\square$, as determined through a measurement using a probe diameter of 2 mm and a probe-to-probe distance of 20 mm.

Furthermore, since trays are exposed to a drying temperature of from 100 to 120° C. in head cleaning and drying as described above, the tray of the invention preferably has a heat distortion temperature (ASTM D684, 4.6-kg load) of 110° C. or higher from the standpoint of heat resistance during the drying.

The thermoplastic resin material used as a matrix resin in the invention preferably comprises at least one member selected from polycarbonates, poly(butylene terephthalate), poly(ethylene terephthalate), and polypropylene.

Modes for carrying out the invention will be described below in detail.

The carbon fibrils used in the invention have a fiber diameter of 100 mm or smaller and an aspect ratio of 5 or larger. For example, the fibrils described in JP-W-8-508534 can be used.

In case where the carbon fibrils have a fiber diameter exceeding 100 mm, the carbon fibrils in a matrix resin are in insufficient contact with one another and, hence, a stable resistivity is not obtained. The fiber diameter of the carbon fibrils is especially preferably 20 nm or smaller. The reason for this is as follows. As long as such thin carbon fibrils are used there is little possibility that even if carbon fibrils fall off, the carbon fibrils which have fallen off might cause head crushing, because the clearance between an MR element and a hard disk is generally 50 nm. However, the fiber diameter of the carbon fibrils is desirably 0.1 nm or larger, especially 0.5 nm or lager, because carbon fibrils having an excessively small fiber diameter are difficult to produce.

In case where the carbon fibrils have an aspect ratio smaller than 5, a sufficient anchoring effect cannot be obtained in a matrix resin to cause the problem of the generation of wearing dust and particles. Because of this, carbon fibrils having an aspect ratio of 5 or larger, preferably 100 or larger, more preferably 1,000 or larger, are used.

As described above, the carbon fibrils have a tubular shape. The wall thickness of each of these carbon fibrils is preferably about from 0.1 to 0.4 times the outer diameter thereof, which is usually in the range of from 3.5 to 75 nm.

As the carbon fibril, commercial available products can be used. For example, "BN" manufactured by Hyperion Catalysis International, Inc. (fiber diameter, 10–20 nm; aspect ratio, 500–2,000) or the like can be used.

In the case where at least part of the carbon fibrils in a matrix resin are present as aggregates, it is desirable that this resin composition should contain no fibril aggregates having a diameter of about 50 $\mu$m or larger, preferably 10 $\mu$m or lager, as measured on an areal basis.

In the invention, from 0.1 to 8 parts by weight of such carbon fibrils are incorporated into 100 parts by weight of a thermoplastic resin material, When the incorporation amount of carbon fibrils is smaller than 0.1 part by weight, the composition has too high a resistivity, no conductivity, and poor antistatic performance. On the other hand, when the incorporation amount of carbon fibrils exceeds 8 parts by weight, the composition not only tends to give a molding having a reduced surface resistivity but also has problems, for example, that dust generation becomes severer and that the composition has considerably impaired moldability. The preferred range of the incorporation amount of carbon fibrils is from 1 to 4 parts by weight per 100 parts by weight of the thermoplastic resin material.

On the other hand, examples of the thermoplastic resin material used as a matrix resin in the invention include aliphatic polyolefins such as polyethylene, polypropylene, polybutene, and polymethylpentene; alicyclic polyolefins; and non-olefin resins such as aromatic polycarbonates, poly (butylene terephthalate), poly(ethylene terephlthalate), poly (phenylene sulfide), various polyamides (e.g., nylon 6, 66, nylon 610, and nylon MXD6), polyetherides, polysulfones, polyethersulfones, polyetheretherketones, acrylic resins, styrene resins, modified poly(phenylene ether)s, and liquid-crystal polyesters.

As described above, trays for transporting MR heads are exposed to a drying temperature of from 100 to 120° C. in head cleaning and drying. From the standpoint of heat resistance during this drying, it is therefore preferred in the invention to use a matrix resin capable of having a heat distortion temperature (ASTM D684, 4.6-kg load) of 110° C. or higher. Especially desirable from the standpoints of heat resistance and cost are polypropylene, polycarbonates, polyethylene terephthalate), poly(butylene terephthalate), and modified poly(phenylene ether)s. Preferred from the standpoint of dimensional accuracy, including warpage resistance, are polycarbonates, poly(butylene terephthalate), and poly(ethylene terephthalate).

Additional ingredients can be incorporated into the resin composition according to the invention if desired. Examples of the additional ingredients include various additive such as inorganic fibrous reinforcements such as glass fibers, silica fibers, silica-alumina fibers, potassium titanate fibers, aluminum borate fibers, and aluminum fibers; organic fibrous reinforcements such as aramid fibers, polyimide fibers, and fluororesin fibers; inorganic fillers such as talc, calcium carbonate, mica, glass beads, glass powders, and glass balloons; solid lubricants such as fluororesin powders and molybdenum disulfide; plasticizers such as paraffin oils; antioxidants, heat stabilizers; light stabilizers; ultraviolet absorbers; neutralizers; lubricants; compatibilizing agents; antifogging agents; antiblocking agents; slip agents; dispersants; colorants; antifungal agents; and fluorescent brighteners.

Furthermore, a conductive filler other than carbon fibrils can also be used in the resin composition according to the invention. For example, use can be made of conductive fillers such as metallic fillers such as aluminum, silver, copper, zinc, nickel, stainless steel, brass, and titanium; carbonaceous fillers such as various carbon blacks, graphites (artificial graphite and natural graphite), particles of vitreous carbon, pitch-derived carbon fibers, PAN-derived carbon fibers, and graphite whiskers; and metal oxide fillers such as zinc oxide, tin oxide, and indium oxide. In the case of using a metal oxide filler which generates excess electrons due to the presence of lattice defects and thus shows conductivity, a dopant may be added to the metal oxide so as to enhance the conductivity. For example, aluminum, antimony, and tin are used as dopants for zinc oxide, tin oxide, and indium oxide, respectively. It is also possible to use a composite conductive filler formed by coating carbon fibers or the like with a metal or by depositing conductive tin oxide on the surface of potassium titanate whiskers.

Processes for producing the resin composition according to the invention are not particularly limited as long as they are suitable for the matrix resin used. For example, the composition can be produced by mixing a thermoplastic resin material with carbon fibrils and then melt-kneading the mixture with a Banbury mixer, roll mill, Brabender, single-screw kneading extruder, twin-screw kneading extruder, kneader, or the like.

The resin composition according to the invention is desirably produced by the process described, e.g., in JP-W-8-508534. This process is conducted in the following manner. Carbon fibrils are dispersed into a matrix resin, for example, with a high-speed mixer manufactured by Henschel. Subsequently, a shearing force is applied to the mixture, for example, with a corotating twin-screw extruder available from Werner-Pfleiderer, a counter-rotating twin-screw extruder manufactured by Leistritz, or a Ko-Kneader manufactured by Buss to thereby reduce carbon fibril aggregates to a smaller size. The shearing force is applied until substantially all of the aggregates present in the mixture are reduced to a diameter smaller than about 50 $\mu$m as measured on an areal basis, preferably until at least 90% of the aggregates present are reduced to a diameter smaller than about 25 $\mu$m as measured on an areal basis. The shearing force is more preferably applied until substantially all of the aggregates present are reduced to a diameter smaller than about 5 $\mu$m as measured on an areal basis, and especially preferably applied until 98% of the aggregates present are reduced to a diameter smaller than about 3 $\mu$m as measured on an areal basis.

It is also possible to prepare beforehand a master batch highly filled with carbon fibrils and dilute it thereafter. Use of the master batch method is desirable in that since carbon fibrils are present in the master batch in a higher concentration, a shearing force causing dispersion is enhanced and, hence, the carbon fibrils are more easily dispersed.

The tray of the invention for carrying magnetoresistive heads of magnetic disks is produced by molding pellets of the thus-produced resin composition into a given shape. Examples of techniques for this molding include extrusion molding, blow molding, injection molding, and vacuum forming. Although injection molding is desirable among these molding techniques from the standpoint of cost, it is necessary to select appropriate conditions because the products vary in surface resistivity with resin temperature, mold temperature, and molding pressure depending on the structure of the mold.

In producing the tray of the invention for carrying magnetoresistive heads of magnetic disks, the molding thus produced may be subjected to an annealing treatment at ordinary pressure or a reduced pressure and at a temperature not higher than the heat distortion temperature of the material, when a volatile gas generating therefrom may be problematic in the use of the molding.

Incidentally, the tray of the invention for carrying magnetoresistive heads of magnetic disks has a surface resistivity in the range of from $10^4$ to $10^{12}$ $\Omega/\square$, especially from log to $10^6$ to $10^{12}$ $\Omega/\square$, as determined through a measurement using a probe diameter of 2 mm and a probe-to-probe distance of 20 mm. Namely, the tray is excellent also in the evenness of surface resistivity in extremely small areas.

In conventional measurements of surface resistivity, electrodes having a relatively large area have generally been used. For example, according to ASTM D257, a peripheral electrode of about 830 $mm^2$ and a central electrode of about 490 $mm^2$ are used as smaller-area electrodes.

Found values of surface resistivity obtained with such electrodes having a relatively large area are values influenced by an average contact resistance in the area in contact with the electrodes. It is therefore impossible to detect resistivity unevenness within the electrode areas.

On the other hand, in molded articles obtained by injection molding, the skin layer on the molding surface is apt to have unevenness of thickness depending on mold pressure or concentration unevenness. Furthermore, the areas where the material flowed with intense shearing, as around the gate, highly tend to have an increased resistivity due to the orientation of fibers or structures, while the area corresponding to the end of the mold or around a weld highly tends to have a reduced resistivity. In particular, in the case of a filler having a relatively large fiber diameter like carbon fibers, resistivity is apt to fluctuate depending on whether a skin is present or not and on the state of fiber contacting which varies with orientation.

In trays for carrying conventional electronic parts, such slight fluctuations of resistivity have not been regarded as problematic. However, trays for carrying devices extremely sensitive to static electricity, like MR head transfer trays, are required to have evenness of resistivity in smaller areas.

Consequently, in the invention, found values of surface resistivity obtained for minute areas using a probe diameter of 2 mm and a probe-to-probe distance of 20 mm are used as indexes to thereby regulate evenness of surface resistivity in a high degree.

The invention will be explained below in more detail by reference to an Example and Comparative Examples.

EXAMPLE 1

A master batch prepared beforehand by dispersing carbon fibrils (fiber diameter, about 10 nm; aspect ratio, 500–2,000) into a polycarbonate in an incorporation amount of 15% by weight ("BN Type" manufactured by Hyperion Catalysis International, Inc.) was used. This master batch was diluted with a polycarbonate ("NOVAREX 7025A" manufactured by Mitsubishi Engineering Plastics Co., Ltd.) and the mixture was kneaded to thereby obtain a resin composition in which the addition amount of the carbon fibrils was 4.5 parts by weight per 100 parts by weight of the resin. A twin-screw kneading extruder was used for the kneading. After the kneading, the composition was pelletized.

Sections having a thickness of 1 μm were cut out of the resultant pellets with a microtome and examined with an optical microscope. These sections were obtained from arbitrarily selected ten parts. As a result, no carbon fibril aggregates larger than 50 μm were observed. Furthermore, it was ascertained with a transmission electron microscope that carbon fibrils having a fiber diameter of about 10 nm were evenly dispersed and that each fibril was not straight but meandered.

Thereafter, the pelletized resin was molded with an injection molding machine to produce tray samples of a sheet form having dimensions of 100 mm by 100 mm by 2 mm (thickness) (hereinafter referred to as sheet samples).

This resin composition had a heat distortion temperature of 145° C. as measured in accordance with ASTM D694 (4.6-kg load).

Figure 2:
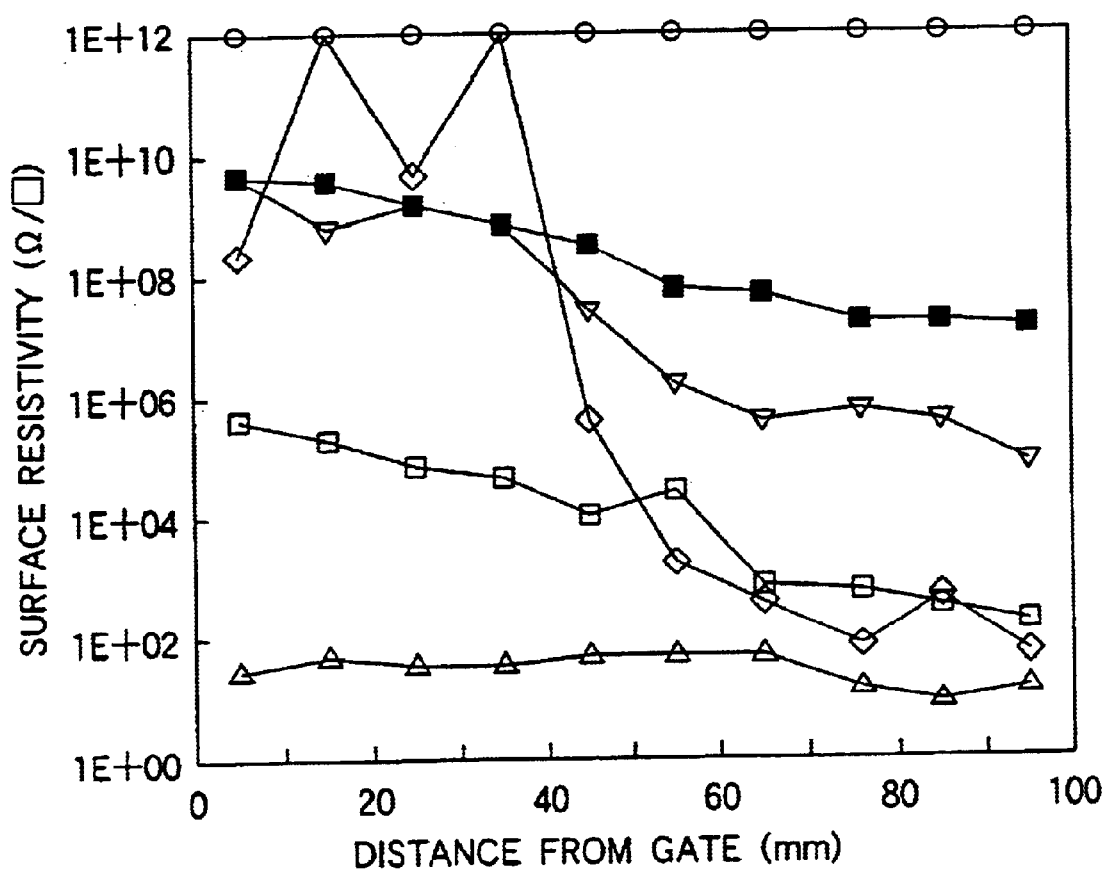
FIG. 2 is a graphic presentation showing the results of the surface resistivity measurements in Example 1 and Comparative Examples 1 to 5.

The sheet samples obtained were evaluated for properties by the following methods. The results are shown in Table 1 and FIGS. 2 and 3. Prior to the evaluations of particle contamination, ion contamination, and nonvolatile-organic contamination among the following evaluations, the sheet samples were subjected, as a pretreatment for the evaluations, to 8-minute ultrasonic cleaning with pure water and then to 30-minute drying in a 10° C. oven. This operation was conducted in a clean room. All the containers used for the sheet sample immersion were glass containers.

Examination of Surface State

A surface of a sheet sample was examined on a photograph thereof taken with an optical microscope. (The results are shown in Table 1.)

Surface Resistivity

The surface resistivity of a sheet sample was measured with Hiresta IP (manufactured by Dia Instrment Co.) using two probes (probe diameter, 2 mm; probe-to-probe distance, 20 mm) at an applied voltage of 10 V. With respect to samples having a surface resistivity lower than $10^4$ Ω/□, measurements were made with Loresta (manufactured by Dia Instrument Co.) using four probes (probe diameter, 1 mm; probe-to-probe distance, 10 mm).

The position of measurement is shown in FIG. 1. Probes 2A and 2B were contacted to two points which were located respectively on both sides of the center of a sheet sample 1 so that a straight line passing through the two points were perpendicular to the direction of resin flow. The measurement was made at an interval of 10 mm from the gate to the opposite side. (A graph showing the found values is given in FIG. 2 (■—■ in the figure). The maximum and minimum values are given in Table 1.)

Surface Resistivity in Minute Areas

Figure 3:
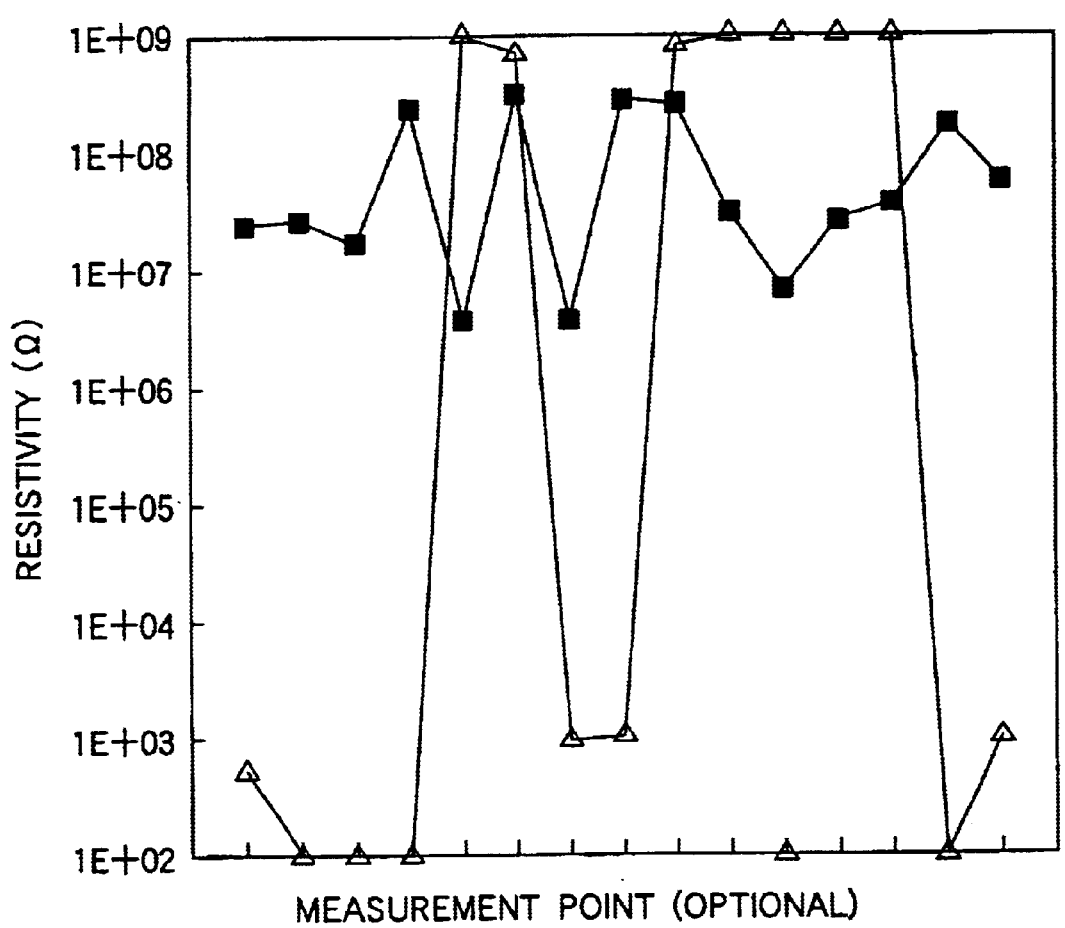
FIG. 3 is a graphic presentation showing the results of the measurements of surface resistivity in minute areas in Example 1 and Comparative Example 2.

Minute electrodes having a tip shape of 0.5 mm-R were pressed at a distance of 2 mm against a surface of a sheet sample under a load of 20 g, and the resistance between the electrodes was measured at an applied voltage of 10 V. For this resistance measurement, high-resistance ohmmeter R8340A, manufactured by Advantest Corp., was used. (The results are shown in FIG. 3 (■—■ in the figure).)

Abrasion Loss in Scratching

The amount of dust generated by a sheet sample upon scratching was evaluated with a T-bar abrasion tester using abrasion ring H18 under the conditions of a load of 500 gf and a revolution speed of 500 revolutions. The abrasion loss weight was thus determined (the results are shown in Table 1).

Particle Contamination

One sheet sample was immersed in 500 mL of pure water, and ultrasonic wave (40 kHz, 0.5 W/cm$^2$) was applied thereto for 60 seconds. Thereafter, the resultant pure-water extract was sucked with a particle counter for particles in liquid to thereby determine the particle sizes (diameters of dust particles) and the number thereof (the results are shown in Table 1).

Ion Contamination

One sheet sample described above was immersed in 50 mL of pure water, and this water was stirred at 60° C. for 60 minutes. Thereafter, the ions which had thus dissolved in the pure water were analyzed by ion chromatography (the results are shown in Table 1).

Nonvolatile-Organic Contamination

One sheet sample described above was immersed in 50 mL of "Asahi Krin AX-225EC" (manufactured by Sumitomo 3M Ltd.), and ultrasonic wave (40 kHz, 0.5 W/cm$^2$) was applied thereto for 60 seconds. Thereafter, the resultant extract was volatilized on an aluminum pan at 100° C., and the residue was weighed (the results are shown in Table 1).

COMPARATIVE EXAMPLE 1

Into 100 parts by weight of a polycarbonate ("NOVAREX 7025A" manufactured by Mitsubishi Engineering Plastics Co., Ltd.) were incorporated 15 parts by weight of PAN-derived carbon fibers ("HTA-C6-SR" manufactured by Toho Rayon Co., Ltd.; fiber diameter, 7 μm; aspect ratio, 1,000) Sheet samples having the same dimensions as in Example 1 were obtained therefrom in the same manner as in Example 1. The sheet samples obtained were evaluated for surface state, surface resistivity, and various contaminations in the same manner as in Example 1. The results are shown in Table 1 and FIG. 2 (◇—◇ in the figure).

COMPARATIVE EXAMPLE 2

Into 100 parts by weight of a polycarbonate ("NOVAREX 7025A" manufactured by Mitsubishi Engineering Plastics Co,, Ltd.) were incorporated 30 parts by weight of PAN-derived carbon fibers ("HTA-C6-SR" manufactured by Toho Rayon Co., Ltd.). Sheet samples having the same dimensions as in Example 1 were obtained therefrom in the same manner as in Example 1. The sheet samples obtained were evaluated for surface resistivity, surface resistivity in minute areas, and various contaminations in the same manner as in Example 1. The results are shown in Table 1 and FIGS. 2 and 3 (△—△ in the respective figures).

COMPARATIVE EXAMPLE 3

Sheet samples having the same dimensions as in Example 1 were obtained in the same manner as in Example 1, except that a resin composition consisting of 100 parts by weight of a resin and 10 parts by weight of carbon fibrils was obtained by diluting a carbon fibril master batch prepared by dispersing carbon fibrils into the same polycarbonate as that used in Example 1 with a polycarbonate ("NOVAREX 7025A" manufactured by Mitsubishi Engineering Plastics Co., Ltd.). The sheet samples obtained were evaluated for surface resistivity, abrasion loss in scratching, and particle contamination in the same manner as in Example 1. The results are shown in Table 1 and FIG. 2 (□—□ in the figure).

COMPARATIVE EXAMPLE 4

Sheet samples having the same dimensions as in Example 1 were obtained in the same manner as in Example 1, except that use was made of a resin composition prepared by incorporating 16 parts by weight of acetylene black ("Denka Black" manufactured by Denki Kagaku Kogyo K.K.) as a conductive carbon black into 100 parts by weight of a polycarbonate ("NOVAREX 7025A" manufactured by Mitsubishi Engineering Plastics Co., Ltd.). The sheet samples obtained were evaluated for surface resistivity, abrasion loss in scratching, and particle contamination in the same manner as in Example 1. the results are shown in Table 1 and FIG. 2 (▽—▽ in the figure)

COMPARATIVE EXAMPLE 5

Sheet samples having the same dimensions as in Example 1 were obtained in the same manner as in Example 1, except that a resin composition consisting of 100 parts by weight of a resin and 0.05 parts by weight of carbon fibrils was obtained by diluting a carbon fibril master batch prepared by dispersing carbon fibrils into the same polycarbonate as that used in Example 1 with a polycarbonate ("NOVAREX 7025A" manufactured by Mitsubishi Engineering Plastics Co., Ltd.). The sheet samples obtained were evaluated for surface resistivity in the same manner as in Example 1. The results are shown in Table 1 and FIG. 2 (○—○ in the figure).

TABLE 1

| Example | | | Example 1 | Comparative Example 1 | Comparative Example 2 | Comparative Example 3 | Comparative Example 4 | Comparative Example 5 |
|---|---|---|---|---|---|---|---|---|
| Examination of surface state | | | the surface was extremely even and smooth | carbon fibers were exposed, and the degree of exposure was uneven | | | | |
| Surface resistivity* (Ω/□) | Maximum | | $5 \times 10^9$ | $>10^{12}$ | $<10^4$ ($8 \times 10^1$) | $6 \times 10^5$ | $5 \times 10^9$ | $>10^{12}$ |
| | Minimum | | $2 \times 10^7$ | $<10^4$ ($8 \times 10^1$) | $<10^4$ ($1 \times 10^1$) | $<10^4$ ($2 \times 10^2$) | $1 \times 10^5$ | |
| Abrasion loss inscratching (mg) | | | 95 | | | | 140 | 160 |
| Particle contamination (pcs/cm$^2$) | Particle size | 0.3 μm | 6160 | 34400 | 56700 | 20290 | 89530 | |
| | | 0.5 μm | 1200 | 13380 | 26330 | 8960 | 37300 | |
| | | 0.7 μm | 600 | 7950 | 11000 | 2580 | 14380 | |
| | | 1.0 μm | 310 | 4110 | 6820 | 1020 | 3430 | |
| | | 2.0 μm | 60 | 1060 | 1770 | 750 | 960 | |
| Ion contamination (μg/cm$^2$) | Kind of ion | F$^-$ | not detected | 0.0055 | 0.0098 | | | |
| | | Cl$^-$ | 0.0015 | 0.0158 | 0.0220 | | | |
| | | NO$_3^-$ | 0.0020 | 0.0026 | 0.0032 | | | |
| Nonvolatile-organic contamination (μg/cm$^2$) | | | 0.31 | 0.67 | 0.82 | | | |

*The value in each parenthesis was obtained with Loresta using four probes, and the other values were obtained with Hiresta at an applied voltage of 100 V.

manufactured by Mitsubishi Engineering Plastics Co., Ltd.). The sheet samples obtained were evaluated for surface resistivity, abrasion loss in scratching, and particle contamination in the same manner as in Example 1. The results are shown in Table 1 and FIG. 2 (□—□ in the figure).

Table 1 shows the following.

In Comparative Examples 1 and 2, in which carbon fibers were incorporated, the composition in which the incorporation amount thereof was small (Comparative Example 1) only gave molded articles which were uneven because they had high-resistance or low-resistance areas, while the composition in which the incorporation amount thereof was large (Comparative Example 2) gave molded articles which each had too low a resistivity throughout. Thus, these molded articles failed to have a stable resistivity in the range of from $10^4$ to $10^{12}$ Ω/□. In the resistivity measurement in minute areas, those molded articles were found to have areas having an exceedingly high resistance. In such molded articles, safety is impaired with respect to contacting with, e.g., the sharp tip of the lead wire attached to an MR head. Furthermore, the samples of Comparative Examples 1 and 2 suffered considerable particle falling and hence had the high possibility of damaging or fouling devices. In particular, in view of the fact that carbon fibers were exposed on molding surfaces, there is a high possibility that products might come into contact with such exposed parts or that carbon fibers themselves might fall off.

Even the molded articles containing carbon fibrils not only have too low a resistivity but release wearing dust or particles in an increased amount when the addition amount of the carbon fibrils is too large as in Comparative Example 3. Conversely, too small addition amounts of carbon fibrils as in Comparative Example 5 result in too high a resistivity and impaired antistatic performance.

As shown in Comparative Example 4, the system containing carbon black not only was insufficient in evenness of resistivity but also necessitated a large addition amount so as to obtain a necessary resistivity. As a result, the generation of wearing dust or particles increased considerably.

In contrast, as shown in Example 1, the composition consisting of a thermoplastic resin compounded with a specific amount of carbon fibrils had excellent heat resistance and showed a stable resistivity in the range of from $10^4$ to $10^{12}$ Ω/□, which is required of MR head trays. Furthermore, the molding surface was even and smooth and, in the resistivity measurement in minute areas, showed satisfactory reproducibility accordingly. It is thought that these effects are attributable to the fact that the carbon fibrils dispersed in the resin formed a far finer conductive network than carbon fibers.

In addition, the molded articles were significantly inhibited from releasing particles upon wearing, cleaning, etc. This is attributable to the fact that the carbon fibrils, whose shape is not straight but meanders, bring about an enhanced anchoring effect in the matrix resin. As a result, the carbon fibrils themselves hardly fall off upon scratching, wearing, or cleaning, and the resin also hardly peels off the fibers. Furthermore, the carbon fibrils used in the invention are less apt to cause ion contamination or contamination with nonvolatile organics.

Industrial Applicability

As described above in detail, the invention provides a tray for carrying magnetoresistive heads of magnetic disks which has excellent heat resistance, an even surface state, and a stable surface resistivity in the range of from $10^4$ to $10^{12}$ Ω/□, is inhibited from generating wearing dust upon scratching, wearing, or cleaning, and is almost free from the problem of head fouling or damage caused by ions, nonvolatile organics, etc.

What is claimed is:

1. A tray for carrying a magnetoresistive head of magnetic disks, said magnetoresistive head of magnetic disks comprising an arm part, an MR element attached to the arm part, and a lead wire connected to the MR element, characterized in that said tray is a molding of a resin composition comprising a thermoplastic resin material and carbon fibrils incorporated therein, said carbon fibrils have a fiber diameter of 100 nm or smaller and a fiber length/fiber diameter ratio of 5 or larger, and the incorporation amount of said carbon fibrils is from 0.1 to 8 parts by weight per 100 parts by weight of said thermoplastic resin material, and said tray having a substantially even surface resistivity within the range of from $10^4$ to $10^{12}$ Ω/□ as measured by using a probe diameter of 2 mm and a probe-to-probe distance of 20 mm.

2. The tray of claim 1, wherein the substantially even surface resistivity is within the range from $10^6$ to $10^{12}$ Ω/□.

3. The tray of claim 1, having a heat distortion temperature (ASTM D 684, 4.6-kg load) of 110° C. or higher.

4. The tray of claim 1, wherein said thermoplastic resin material comprises polycarbonate, poly(butylene terephthalate), poly(ethylene terephthalate), or polypropylene.

5. The tray of claim 1, wherein the fiber diameter is 20 nm or smaller.

6. The tray of claim 5, wherein the fiber diameter is from 0.1 to 20 nm.

7. The tray of claim 6, wherein the fiber diameter is from 0.5 to 20 nm.

8. The tray of claim 1, wherein said carbon fibrils have a fiber length/fiber diameter ratio of 100 or larger.

9. The tray of claim 8, wherein the carbon fibrils have a fiber length/fiber diameter ratio of 1,000 or larger.

10. The tray of claim 1, wherein said carbon fibrils have a tubular shape.

11. The tray of claim 1, wherein said resin composition further comprises inorganic fibers, fluororesin fibers, solid lubricants, inorganic fillers, plasticizers, antioxidants, heat stabilizers, light stabilizers, ultraviolet absorbers, neutralizers, compatibilizing agents, antifogging agents, antiblocking agents, slip agents, dispersants, colorants, antifungal agents or fluorescent brighteners.

12. The tray of claim 1, which further comprises a conductive fiber other than carbon fibrils.

13. The tray of claim 2, wherein the substantially even surface resistivity is within the range from $2\times10^7$ to $5\times10^9$ Ω/□.

14. The tray according to claim 10, wherein the wall thickness of each of the carbon fibrils is from 0.1 to 0.4 times the outer diameter thereof.

15. The tray according to claim 14, wherein the wall thickness of each of the carbon fibrils is from 3.5 to 75 nm.

16. The tray according to claim 10, wherein the fibrils comprises a cylindrical core and an outer layer of graphite deposited on the core substantially concentrically.

17. A tray carrying a magnetoresistive head of magnetic disks, said magnetoresistive head of magnetic disks comprising an arm part, an MR element attached to the arm part, and a lead wire connected to the MR element, characterized in that said tray is a molding of a resin composition comprising a thermoplastic resin material and carbon fibrils incorporated therein, said carbon fibrils have a fiber diameter of 100 nm or smaller and a giver length/fiber diameter ratio of 5 or larger, and the incorporation amount of said carbon fibrils is from 0.1 to 8 parts by weight per 100 parts by weight of said thermoplastic resin material, and said tray having a substantially even surface resistivity within the range of from $10^4$ to $10^{12}$ Ω/□ as measured by using a probe diameter of 2 mm and a probe-to-probe distance of 20 mm.

* * * * *

UNITED STATES PATENT AND TRADEMARK OFFICE
CERTIFICATE OF CORRECTION

PATENT NO. : 6,686,009 B2
DATED : February 3, 2004
INVENTOR(S) : Tanaka et al.

It is certified that error appears in the above-identified patent and that said Letters Patent is hereby corrected as shown below:

<u>Title page,</u>
Item [73], Assignee, should read:
-- [73]   Assignees:  Yukadenshi Co., Ltd. Tokyo (JP);
                     Alps Electric Co., Ltd. Tokyo (JP) --

Signed and Sealed this

Thirteenth Day of April, 2004

JON W. DUDAS
*Acting Director of the United States Patent and Trademark Office*